(12) United States Patent
Jia et al.

(10) Patent No.: US 11,315,241 B2
(45) Date of Patent: Apr. 26, 2022

(54) METHOD, COMPUTER DEVICE AND STORAGE MEDIUM OF FUNDUS OCULI IMAGE ANALYSIS

(71) Applicants: SHANGHAI SIXTH PEOPLE'S HOSPITAL, Shanghai (CN); SHANGHAI JIAO TONG UNIVERSITY, Shanghai (CN)

(72) Inventors: Weiping Jia, Shanghai (CN); Bin Sheng, Shanghai (CN); Yaxin Shen, Shanghai (CN); Huating Li, Shanghai (CN)

(73) Assignees: SHANGHAI SIXTH PEOPLE'S HOSPITAL, Shanghai (CN); SHANGHAI JIAO TONG UNIVERSITY, Shanghai (CN)

( * ) Notice: Subject to any disclaimer, the term of this patent is extended or adjusted under 35 U.S.C. 154(b) by 660 days.

(21) Appl. No.: 16/315,768

(22) PCT Filed: Aug. 2, 2018

(86) PCT No.: PCT/CN2018/098360
§ 371 (c)(1),
(2) Date: Jan. 7, 2019

(87) PCT Pub. No.: WO2019/232910
PCT Pub. Date: Dec. 12, 2019

(65) Prior Publication Data
US 2021/0327051 A1   Oct. 21, 2021

(30) Foreign Application Priority Data
Jun. 8, 2018 (CN) .......................... 201810584685.7

(51) Int. Cl.
*G06K 9/00* (2006.01)
*G06T 7/00* (2017.01)

(52) U.S. Cl.
CPC .. *G06T 7/0012* (2013.01); *G06T 2207/20081* (2013.01); *G06T 2207/20084* (2013.01);
(Continued)

(58) Field of Classification Search
CPC ......... G06T 7/0012; G06T 2207/30041; G06T 2207/30168; G06T 2207/20081; G06T 2207/20084
(Continued)

(56) References Cited

U.S. PATENT DOCUMENTS

2015/0104087 A1\* 4/2015 Katuwal .................. G06T 7/11
382/128
2015/0124218 A1\* 5/2015 Yonezawa ............ A61B 3/0025
351/206
(Continued)

FOREIGN PATENT DOCUMENTS

CN    204698510 U    10/2015
CN    107209933 A    9/2017
(Continued)

OTHER PUBLICATIONS

International Search Report and Written Opinion (English translation) received for International Application No. PCT/CN2018/098360, dated Feb. 2, 2019, 6 pages.

*Primary Examiner* — Van D Huynh
(74) *Attorney, Agent, or Firm* — Dorsey & Whitney LLP

(57) ABSTRACT

A method of fundus oculi image analysis includes acquiring a target fundus oculi image; analyzing the target fundus oculi image by a fundus oculi image analysis model determined by training to acquire an image analysis result of the target fundus oculi image; and the fundus oculi image analysis model includes at least one of an image overall grade prediction sub-model and an image quality factor sub-model. The method performs quality analysis on the
(Continued)

target fundus oculi image by the fundus oculi image analysis model, and when the model includes the overall grade prediction sub-model, a prediction result of whether the target fundus oculi image as a whole is gradable can be acquired; when the model includes the image quality factor sub-model, the analysis result of the fundus oculi image quality factor can be acquired and the image analysis model is determined by extensive image training, and the reliability of the result of whether the image is gradable determined based on the above model is high.

15 Claims, 5 Drawing Sheets

(52) U.S. Cl.
CPC ............... *G06T 2207/30041* (2013.01); *G06T 2207/30168* (2013.01)

(58) Field of Classification Search
USPC ........................................................ 382/128
See application file for complete search history.

(56) References Cited

U.S. PATENT DOCUMENTS

| | | | |
|---|---|---|---|
| 2016/0100753 A1* | 4/2016 | Liu | A61B 3/12 |
| | | | 382/128 |
| 2017/0112372 A1 | 4/2017 | Chakravorty et al. | |
| 2018/0181833 A1* | 6/2018 | Yin | A61B 3/12 |
| 2018/0247107 A1* | 8/2018 | Murthy | G06K 9/4628 |
| 2018/0315193 A1* | 11/2018 | Paschalakis | G06N 3/08 |
| 2019/0110753 A1* | 4/2019 | Zhang | G16H 50/20 |
| 2020/0000331 A1* | 1/2020 | Chakravorty | G06K 9/0061 |
| 2020/0211235 A1* | 7/2020 | Hsu | G06K 9/38 |
| 2020/0260944 A1* | 8/2020 | Sun | A61B 3/0025 |

FOREIGN PATENT DOCUMENTS

| | | | |
|---|---|---|---|
| CN | 107330876 A | | 11/2017 |
| CN | 107862678 A | * | 3/2018 |
| CN | 108021916 A | | 5/2018 |

* cited by examiner

METHOD, COMPUTER DEVICE AND STORAGE MEDIUM OF FUNDUS OCULI IMAGE ANALYSIS

CROSS-REFERENCE TO RELATED APPLICATION

The present application is a U.S. National Stage Application of PCT/CN2018/098360 filed on Aug. 2, 2018, which claims priority to Chinese Patent Application No. 201810584685.7 entitled "METHOD, COMPUTER DEVICE AND STORAGE MEDIUM OF FUNDUS OCULI IMAGE ANALYSIS" filed on Jun. 8, 2018, the entire contents of each of the foregoing applications are incorporated herein by reference.

TECHNICAL FIELD

The present disclosure relates to the field of image technologies, and in particular, to a method, a computer device, and a storage medium of fundus oculi image analysis.

BACKGROUND

Fundus oculi images are widely used for the diagnosis of fundus diseases such as DR (Diabetic Retinopathy) and macula lutea lesions. For the detection of some symptoms such as micro-aneurysms and intravascular microvascular malformations, the quality of the image itself is highly demanded, and blurred images may cause misdiagnoses, especially by automated diagnostic systems. Therefore, it is necessary to perform an automatic determination of the fundus oculi image quality to filter out undiagnosable or ungradable images prior to the automatic diagnosis of the fundus disease.

Existing methods generally use an overall edge histogram of an image, or vessel segmentation to determine image quality, and these methods need to take into account specific factors affecting the fundus oculi image. However, image quality is often affected by a plurality of factors, and manual feature extraction cannot take into account sufficient quality factors, such that the quality features of the overall image are not extracted sufficiently. In recent years, deep learning has been applied to the fields of image classification, object detection, etc., and has achieved a drastic progress. Some methods analyze the image quality through a convolutional neural network to give a prediction as to whether it can be graded. However, the existing methods determine the quality only through a single two-classification task. The reliability of manual labeling of whether image quality can be DR-graded is not high enough, which affects the training and performance of the network.

SUMMARY

Based on various embodiments of the present disclosure, a method of fundus oculi image analysis, a computer apparatus, and a storage medium are provided.

A method of fundus oculi image analysis includes: acquiring a target fundus oculi image; analyzing the target fundus oculi image by a fundus oculi image analysis model determined by training to acquire an image analysis result of the target fundus oculi image; and the fundus oculi image analysis model includes at least one of an image overall grade prediction sub-model and an image quality factor sub-model; when the fundus oculi image analysis model includes the image overall grade prediction sub-model, the image analysis result includes a prediction result of whether or not the target fundus oculi image is gradable; when the fundus oculi image analysis model includes an image quality factor sub-model, the image analysis result includes an image quality factor analysis result of the target fundus oculi image.

A computer device including a memory and one or more processors, the memory having computer-readable instructions stored therein which, when executed by the one or more processors, causing the one or more processors to perform the steps of the above method.

One or more non-transitory computer-readable storage medium having storing computer-readable instructions stored therein which, when executed by one or more processors, causing the one or more processors to perform the steps of the above method.

The details of one or more embodiments of the application are set forth in the accompanying drawings and the description below. Other features and advantages of the application will be apparent from the description, drawings, and claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments such that the purpose, technical solution, and advantages of the present disclosure will be more apparent. It should be understood that the particular embodiments are described for the purpose of illustrating as opposed to restricting the present disclosure.

Figure 1:
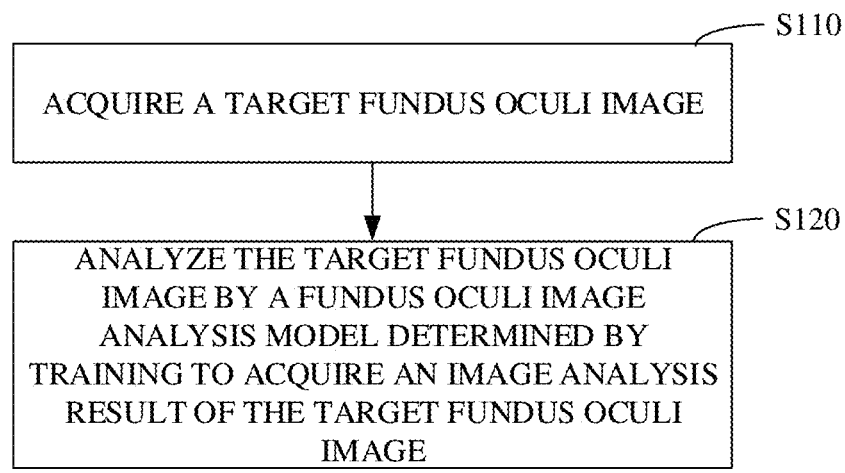
FIG. 1 is a flowchart of a method of fundus oculi image analysis according to an embodiment.

In one embodiment, as shown in FIG. 1, a method of fundus oculi image analysis includes steps S110 and S120.

At step S110, a target fundus oculi image is acquired.

The target fundus oculi image represents the fundus oculi image to be analyzed. In actual cases, the user inputs the captured target fundus oculi image into the system.

At step S120, the target fundus oculi image is analyzed by a fundus oculi image analysis model determined by training to acquire an image analysis result of the target fundus oculi image.

The fundus oculi image analysis model includes at least one of an image overall grade prediction sub-model and an image quality factor sub-model. When the fundus oculi image analysis model includes the image overall grade prediction sub-model, the image analysis result includes a prediction result of whether or not the target fundus oculi image is gradable. When the fundus oculi image analysis model includes an image quality factor sub-model, the image analysis result includes an image quality factor analysis result of the target fundus oculi image. In one embodiment, the prediction result of whether the target fundus oculi image is gradable includes that the target fundus oculi image is gradable and that the target fundus oculi image is not gradable.

The fundus oculi image analysis model includes at least one of an image overall grade prediction sub-model and an image quality factor sub-model, and the image analysis result correspondingly includes at least one of an image overall grade prediction result and an image quality analysis result. The analysis result corresponding to the image overall grade prediction sub-model is the image overall grade prediction result, and the analysis result corresponding to the image quality factor sub-model is the image quality analysis result. When the fundus oculi image analysis model includes the image overall grade prediction sub-model, the image analysis result of the target fundus oculi image includes the image overall grade prediction result. When the fundus oculi image analysis model includes the image quality factor sub-model, the image analysis result of the target fundus oculi image includes the image quality analysis result.

In one embodiment, the image quality factor sub-model includes at least one of an image artifact analysis sub-model, an image clarity analysis sub-model, and an image position analysis sub-model.

When the image quality factor sub-model includes the image artifact analysis sub-model, the corresponding image quality factor analysis result includes the image artifact information. In one embodiment, the image artifact information reflects whether there is an artifact in the target fundus oculi image and, if there is an artifact, the influence of the artifact on the quality of the target fundus oculi image.

When the image quality factor sub-model includes the image clarity analysis sub-model, the corresponding image quality factor analysis result includes image clarity information. In one embodiment, the image clarity information reflects in the fundus oculi image whether a blood vascular arcade or a lesion is identifiable and the identifiable lesion range.

When the image quality factor sub-model includes the image position analysis sub-model, the corresponding image quality factor analysis result includes the image position information. In one embodiment, the image position information reflects in the target fundus oculi image the position information of the macula lutea and optic disc. The macula lutea and optic disc position information includes whether the target fundus oculi image contains macula lutea or optic disc and whether the fundus oculi image contains a region needed for diagnosis around the macula or optic disc.

Figure 2:
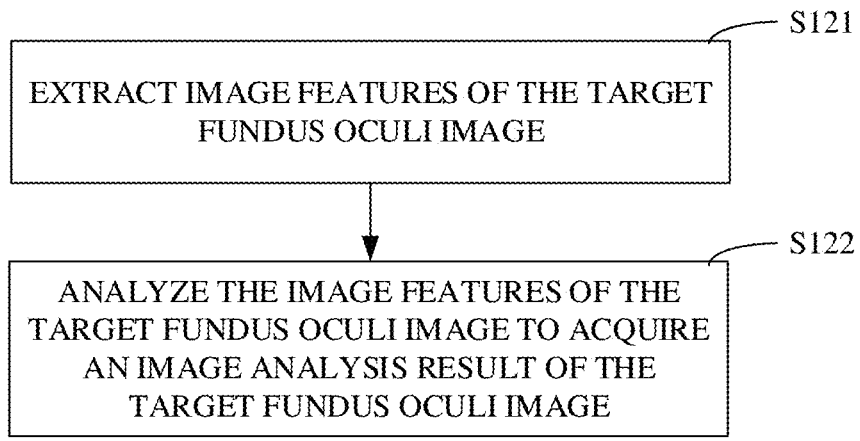
FIG. 2 is a flowchart of a step of acquiring an image analysis result of a target fundus oculi image according to an embodiment.

In one embodiment, as shown in FIG. 2, an image analysis result of the target fundus oculi image is acquired by analyzing the target fundus oculi image by the fundus oculi image analysis model determined by training, including steps S121 and S122.

At step S121, image features of the target fundus oculi image are extracted.

Extracting the image features of the target fundus oculi image is to determine the features to be extracted based on machine learning in a model training process.

At step S122, the image features of the target fundus oculi image are analyzed to acquire an image analysis result of the target fundus oculi image.

After the user inputs the fundus oculi image into the system, the fundus oculi image analysis model performs image feature extraction on the fundus oculi image and analyzes the extracted image features to acquire the image analysis result of the target fundus oculi image.

In one embodiment, prior to extracting the image features of the target fundus oculi image, the method further includes cropping out an effective image region of the target fundus oculi image. In the illustrated embodiment, the target fundus oculi image is an original image of a photographed unprocessed fundus oculi image, and the effective image region is an image region containing effective information necessary for diagnosis in the fundus oculi image.

It can be understood that, in other embodiments, the acquired target fundus oculi image may also be a fundus oculi image that has been cropped out to contain only the effective image region. That is, the step of cropping out the effective image region is completed prior to that the fundus oculi image is inputted into the fundus oculi image analysis model. In the illustrated embodiment, after the target fundus oculi image is acquired, the image features of the target fundus oculi image may be directly extracted.

In a specific embodiment, the result of the prediction of the target fundus oculi image by the image overall grade prediction sub-model is a numerical value between 0 and 1. In one embodiment, when the acquired result is a numerical value greater than or equal to 0 and less than 0.5, the target fundus oculi image is determined as ungradable. When the acquired result is a numerical value greater than or equal to 0.5 and less than or equal to 1, the target fundus oculi image is determined as gradable.

In a specific embodiment, the results acquired by analyzing the target fundus oculi image by the image artifact analysis sub-model include 5 cases, respectively: 1) whether greater than 0 and less than or equal to 1; 2) whether greater than 1 and less than or equal to 4; 3) whether greater than 4 and less than or equal to 6; 4) whether greater than 6 and less than or equal to 8; 5) whether greater than 8 and less than or equal to 10. The results acquired by analyzing the target fundus oculi image by the image clarity analysis sub-model include 4 cases, respectively: 1) whether greater than 1 and less than or equal to 4; 2) whether greater than 4 and less than or equal to 6; 3) whether greater than 6 and less than or equal to 8; 4) whether greater than 8 and less than or equal to 10. The results of the analysis of the target fundus oculi image by the image position analysis sub-model includes 4 cases, respectively: 1) whether greater than 1 and less than or equal to 4; 2) whether greater than 4 and less than or equal to 6; 3) whether greater than 6 and less than or equal to 8; 4) whether greater than 8 and less than or equal to 10. The information correspondence relationship between each type of analysis result and the target fundus oculi image is shown in Table 1.

TABLE 1

Preset Scoring Criteria

| Type | Image Quality | Scores |
|---|---|---|
| Clarity+ | Level 1 vascular arcades identifiable only | 1 |
| | Level 2 vascular arcades and small lesions identifiable | 4 |
| | Level 3 vascular arcades and partial lesions identifiable | 6 |
| | Level 3 vascular arcades and most lesions identifiable | 8 |
| | Level 3 vascular arcades and total lesions identifiable | 10 |
| Position+ | No optic disc or macula lutea | 1 |
| | Optic disc or macula lutea only | 4 |
| | Optic disc and macula lutea included | 6 |
| | Optic disc, macula lutea, and posterior pole vascular arcade about 45 degrees of the posterior pole included | 8 |
| | Optic disc, macula lutea, and posterior pole vascular arcade about 45 degrees of the posterior pole + normotopia included | 10 |
| Artifacts− | No Artifact | 0 |
| | Beyond the posterior pole vascular arcade, in the range of less than ¼ | 1 |
| | Not affecting the macula lutea area, in the range of less than ¼ | 4 |
| | Coverage range more than ¼, less than ½ | 6 |
| | Coverage range more than ½, but not fully covering the posterior pole | 8 |
| | Covering the entire posterior pole | 10 |

In a specific embodiment, the artifact analysis results of the image specifically include the following cases: 1) less than or equal to 0, corresponding to having no artifact; 2) greater than 0 and less than or equal to 1, corresponding to that the artifact is beyond the posterior vascular arcade, and in the range of less than ¼; 3) greater than 1 and less than or equal to 4, corresponding to that the artifact does not affect the macula lutea area and is in the range of less than ¼; 4) greater than 4 and less than or equal to 8, corresponding to that the artifact coverage range is more than ¼ and less than ½; 5) greater than 6 and less than or equal to 8, corresponding to that the coverage range is more than ½, but not fully covering the posterior pole; and 6) greater than 8 and less than or equal to 10, corresponding to that the artifact covering the entire posterior pole.

In a specific embodiment, the image clarity analysis results include the following cases: 1) greater than 0 and less than or equal to 1, corresponding to the result that only Level 1 vascular arcade is identifiable; 2) greater than 1 and less than or equal to 4, corresponding to that Level 2 vascular arcade and a fraction of lesions are identifiable; 3) greater than 4 and less than or equal to 8, corresponding to that Level 3 vascular arcade and some lesions are identifiable; 4) greater than 6 and less than or equal to 8, corresponding to that Level 3 vascular arcade and most lesions can are identifiable; 5) greater than 8 and less than or equal to 10, corresponding to that Level 3 vascular arcade and all lesions are identifiable.

In a specific embodiment, the analysis results of the image position include the following cases: 1) greater than 0 and less than or equal to 1, corresponding to the result that there is no optic disc or macula lutea in the image; 2) greater than 1 and less than or equal to 4, corresponding to that there is only macula lutea or only optic disc in the image; 3) greater than 4 and less than or equal to 8, corresponding to that there are both macula lutea and optic disc in the image; 4) greater than 6 and less than or equal to 8, corresponding to that the image includes optic disc, macula lutea, and posterior pole vascular arcade about 45 degrees of the posterior pole; 5) greater than 8 and less than or equal to 10, corresponding to that the images include optic disc, macula lutea, and posterior pole vascular arcade about 45 degrees of the posterior pole+normotopia.

In the foregoing method of fundus oculi image analysis, after the target fundus oculi image to be analyzed is acquired, the target fundus oculi image is analyzed by the fundus oculi image analysis model determined by training to acquire an image analysis result of the target fundus oculi image. The fundus oculi image analysis model may include at least one of a image overall grade prediction sub-model and an image quality factor sub-model. The foregoing method performs quality analysis on the target fundus oculi image by the fundus oculi image analysis model, and when the model includes an overall grade prediction sub-model, a prediction result of whether or not the target fundus oculi image as a whole is gradable can be acquired. When the model includes the image quality factor sub-model, the analysis result of the fundus oculi image quality factor can be acquired and the image analysis model is determined by extensive image training, and the reliability of the result of whether the image is gradable or not determined based on the foregoing model is high.

In one embodiment, when the fundus oculi image analysis model includes the image overall grade prediction sub-model, the image features include first rectangular coordinate system image features.

In the image overall grade prediction sub-model, the rectangular coordinate system image features of the target fundus oculi image in the rectangular coordinate system are referred to as first rectangular coordinate system image features. In the illustrated embodiment, when the target fundus oculi image is inputted into the image overall grade prediction sub-model for quality analysis, it is necessary to extract and analyze the image features of the target fundus oculi image in the rectangular coordinate system.

When the fundus oculi image analysis model includes the image quality factor sub-model, the image features include first image linking features acquired by linking second rectangular coordinate system image features with first polar coordinate system image features.

In the image quality factor sub-model, the rectangular coordinate system image features of the target fundus oculi image in the rectangular coordinate system are referred to as second rectangular coordinate system image features, and the polar coordinate system image features of the target fundus oculi image in the polar coordinate system are referred to as first polar coordinate system image features. Linking features acquired by linking the second rectangular coordinate image features and the first polar coordinate image features are referred to as first image linking features. In the illustrated embodiment, when the target fundus oculi image is inputted into the image quality factor sub-model for quality analysis, it is necessary to extract and analyze the image linking features of the target fundus oculi image which are acquired by linking the two image features in the rectangular coordinate system and in the polar coordinate system respectively.

In the embodiment of the present disclosure, the extracted image features are extracted based on machine learning at the time of performing quality analysis on one target fundus oculi image. In the above embodiment, the image features in the rectangular coordinate system are extracted from the image overall grade prediction sub-model. The image linking features acquired by linking the rectangular coordinate system image features and the polar coordinate system image features are extracted from the image quality factor sub-model.

In one embodiment, the features of the first rectangular coordinate system image features, the second rectangular coordinate system image features, the first polar coordinate system features, and the first image linking features are all features determined by the fundus oculi image analysis model during training.

In one embodiment, when the image quality factor sub-model includes an image artifact analysis sub-model, the second rectangular coordinate system image features include rectangular coordinate system artifact factor features, the first polar coordinate system features include polar coordinate artifact factor features, and the first image linking features include: artifact factor linking features acquired by linking rectangular coordinates artifact factor features and polar coordinate system artifact factor features.

When the image quality factor sub-model includes an image clarity analysis sub-model, the second rectangular coordinate system image features include rectangular coordinate system clarity factor features, the first polar coordinate system features include polar coordinate clarity factor features, and the first image linking feature includes: clarity factor linking features acquired by linking rectangular coordinate system clarity factor features and polar coordinate system clarity factor features.

When the image quality factor sub-model includes an image position analysis sub-model, the second rectangular coordinate system image features include rectangular coordinate system position factor features, the first polar coordinate system features include polar coordinate position factor features, and the first image linking features includes: position factor linking features acquired by linking rectangular coordinate system position factor features and polar coordinate system position factor features.

The rectangular coordinate system artifact factor feature are artifact factor features in a rectangular coordinate system and extracted from the target fundus oculi image, and the polar coordinate system artifact factor features are artifact factor features in a polar coordinate system and extracted from the target fundus oculi image. The rectangular coordinate system clarity factor features are the clarity factor features in the rectangular coordinate system and extracted from the target fundus oculi image, and the polar coordinate system clarity factor features are the clarity factor feature in the polar coordinate system and extracted for the target fundus oculi image. The rectangular coordinate system position factor feature is a position factor feature in the rectangular coordinate system and extracted from the target fundus oculi image, and the polar coordinate system position factor features are position factor features in the polar coordinate system and extracted from the target fundus oculi image.

In one embodiment, the fundus oculi image analysis model includes an image overall grade prediction sub-model, an image artifact analysis sub-model, an image clarity analysis sub-model, and an image position analysis sub-model. Whether or not a target fundus oculi image is gradable can be predicted, and artifact information, clarity information, and position information can be analyzed. As such, when training the fundus oculi image analysis model, it is possible to analyze the quality information of the fundus oculi image through multi-task learning via the network from image overall grade prediction and artifacts, clarity, and macula lutea optic disc position factors, thereby making the prediction result of whether the fundus oculi image is gradable by the fundus oculi image analysis model more objective. Multi-task learning may avoid an over-fitting problem caused by a network in a single task, and may improve optimization efficiency and prediction accuracy compared to a network in which a single task is separately trained.

Figure 3:
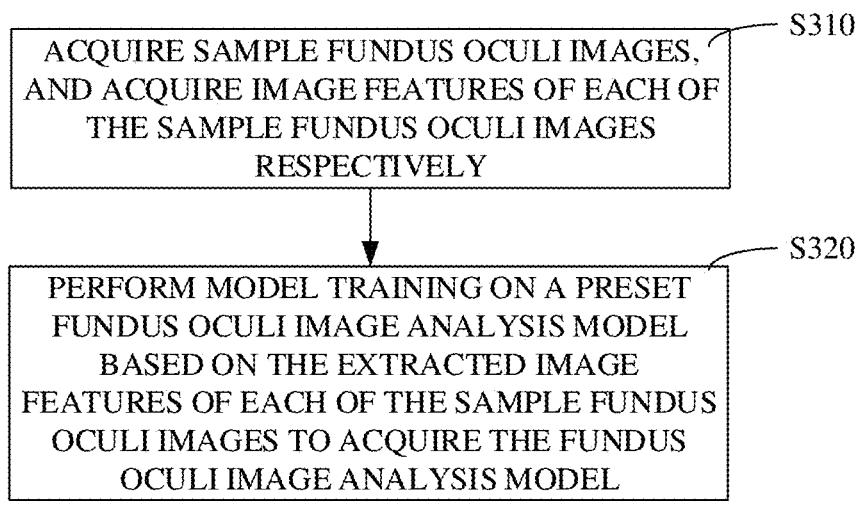
FIG. 3 is a flowchart of training and determining a fundus oculi image analysis model according to an embodiment.

In one embodiment, as shown in FIG. 3, the approach of training to determine the fundus oculi image analysis model includes step S310 and step S320.

At step S310, sample fundus oculi images are acquired, and image features of each of the sample fundus oculi images are acquired respectively.

The sample fundus oculi images are massive sample fundus oculi images that are manually analyzed and scored according to preset scoring criteria. In the illustrated embodiment, each of the sample images carries score tags of artifact, clarity, position, and quality, respectively. The preset scoring criteria are as shown in Table 1.

In one embodiment, extracting the image features of each of the sample fundus oculi images includes:

when the fundus oculi image analysis model includes an image overall grade prediction sub-model, the image feature includes third rectangular coordinate system image features.

In the image overall grade prediction sub-model, the rectangular coordinate system image features of the sample fundus oculi image in the rectangular coordinate system are referred to as third rectangular coordinate system image features. In the illustrated embodiment, when training the image overall grade prediction sub-model, it is necessary to extract the image features of the sample fundus oculi image in the rectangular coordinate system for training.

When the fundus oculi image analysis model includes an image quality factor sub-model, the image features include fourth rectangular coordinate system image features, second polar coordinate system image features, and second image linking features acquired by linking the fourth rectangular coordinate system image features and the second polar coordinate system image features.

In the image quality factor sub-model, rectangular coordinate system image features of the sample fundus oculi image in the rectangular coordinate system are referred to as fourth rectangular coordinate system image features, and polar coordinate system image features of the sample fundus oculi image in the polar coordinate system are referred to as second polar coordinate system image features. The image features acquired by linking the fourth rectangular coordinate system image features and the second polar coordinate system image features are referred to as second image linking features. That is, in the illustrated embodiment, when training the image quality factor sub-model, it is necessary to extract the rectangular coordinate system image features, the polar coordinate system image features, and the image linking features acquired by linking the rectangular coordinate system image features and the polar coordinate system image features of the sample fundus oculi image for training.

In one particular embodiment, the sample fundus oculi images are acquired from a Shanghai Diabetic Retinopy Screening Program (SDRSP). In the sample fundus oculi images collected in the SDRSP, with a real disk as a center and a macula lutea as the center, each eye of each patient is taken a fundus oculi image. Each fundus oculi image is scored manually in view of three factors: artifact, clarity, and position. The scores under the three factors are recorded as three labels of artifact, clarity, and position, respectively. An image overall quality score for determining whether the fundus oculi image is gradable is determined according to the scores carried by the three labels, overall and overallis recorded as an overall grade prediction label. In other words, when determining whether the sample fundus oculi image is gradable by manually scoring, the three factors of artifact, clarity, and position are taken into account, and a corresponding score can be respectively determined under each of the three factors according to preset scoring criteria. The overall quality score of the image can be determined by the scores under the three factors. Whether the sample fundus oculi image is gradable is then determined by the image overall quality score.

In a specific embodiment, when manually scoring the sample fundus oculi image, the relationship between the overall quality score and the artifact score, the clarity score, and the position score is: image overall quality score=clarity score+position score−artifact score. The correspondence relationship between the image overall quality score and whether the image is gradable is: if the image overall quality score is greater than 10, it is determined that the sample fundus oculi image is gradable, otherwise, it is determined that the sample fundus oculi image is not gradable.

In one embodiment, when the image quality factor sub-model includes an image artifact analysis sub-model, the fourth rectangular coordinate system image features include rectangular coordinate system artifact factor features, the second polar coordinate system features include polar coordinate artifact factor features, and the second image linking features include artifact factor linking features acquired by linking of rectangular coordinates artifact factor features and polar coordinate system artifact factor features.

When the image quality factor sub-model includes an image clarity analysis sub-model, the fourth rectangular coordinate system image features include rectangular coordinate system clarity factor features, the second polar coordinate system features include polar coordinate clarity factor features, and the second image linking features include clarity factor linking features acquired by linking rectangular coordinate system clarity factor features and polar coordinate system clarity factor features.

When the image quality factor sub-model includes an image position analysis sub-model, the fourth rectangular coordinate system image features include rectangular coordinate system position factor features, the second polar coordinate system features include polar coordinate position factor features, and the second image linking features include position factor linking features acquired by linking rectangular coordinate system position factor features and polar coordinate system position factor features.

The rectangular coordinate system artifact factor features are artifact factor features in a rectangular coordinate system extracted from the sample fundus oculi image, and the polar coordinate system artifact factor features are artifact factor features in a polar coordinate system extracted from the sample fundus oculi image. The rectangular coordinate system clarity factor features are the clarity factor features in the rectangular coordinate system extracted from the sample fundus oculi image, and the polar coordinate system clarity factor features are the clarity factor features in the polar coordinate system extracted from the sample fundus oculi image. The rectangular coordinate system position factor features are position factor features in a rectangular coordinate system extracted for the sample fundus oculi image, and the polar coordinate system position factor features are position factor features in a polar coordinate system extracted for the sample fundus oculi image.

At step S320, model training is performed on a preset fundus oculi image analysis model based on the extracted image features of each of the sample fundus oculi images to acquire the fundus oculi image analysis model.

In one embodiment, the objective of performing model training on the preset fundus oculi image analysis model is to minimize the total loss function, the total loss function L being determined by:

$$L = \alpha \sum_{t=a,c,f} L_{tp} + \beta \sum_{t=a,c,f} L_{tr} + \gamma \sum_{t=a,c,f} L_t + \delta L_q$$

$\alpha$, $\beta$, $\gamma$, and $\delta$ are weights of loss functions acquired by extracting branches of different features from each sub-model, subscripts r and p are a rectangular coordinate system and a polar coordinate system, respectively, and a, c, f, and q are an image artifact analysis sub-model, an image clarity analysis sub-model, an image position analysis sub-model, and an image overall grade prediction sub-model, respectively. For example, $\alpha$ is a weight of a loss function determined by extracting image features of a polar coordinate system, and $\delta$ is a weight of an image overall grade sub-model. The values of $\alpha$, $\beta$, $\gamma$, and $\delta$ are set according to actual conditions. In a specific embodiment, the values are $\alpha=0.2$, $\beta=0.5$, $\gamma=1.0$, and $\delta=4.0$. The weight of the overall grade prediction sub-model is the largest, which is the main task of optimizing; and the weight ratio of the rectangular coordinate system is slightly higher than that of the polar coordinate system. In a specific embodiment, all models are implemented through a caffe framework, optimized using a random gradient method, and all training data are iterated 15 epochs.

In one embodiment, the loss functions of all sub-models of the fundus oculi image analysis model are determined using the Sigmoid cross entropy loss function. For example, the loss function of the overall grade prediction sub-model is determined as follows:

$$L_q = -\sum_{i=0}^{N} (y_i^q \cdot \log \hat{y}_i^q + (1 - y_i^q) \cdot \log(1 - \hat{y}_i^q))$$

$y_i^q \in \{0,1\}$ is the actual score label;

$$\hat{y}_i^q = \frac{1}{1 + e^{h_i}}$$

is the predicted value.

In one embodiment, prior to that the image features of each of the sample fundus oculi images are extracted respectively, the method further includes the step of cropping out an effective image region of each of the sample fundus oculi images. In the illustrated embodiment, the sample fundus oculi image is a photographed unprocessed fundus oculi image. In the illustrated embodiment, prior to that the features of the sample fundus oculi image are extracted for model training, it is necessary to crop the sample fundus oculi image to acquire an effective image region. The effective image region is an image region including effective information of the fundus oculi image in the sample fundus oculi image.

In one embodiment, prior to that the model training is performed on the preset fundus oculi image analysis model, the method further includes the step of initializing preset fundus oculi image analysis model through migration learning.

Migration learning, which is a research field of machine learning, migrates field knowledge of a problem to another different but related problem. In the illustrated embodiment, the amount of data is implicitly increased by the migration learning method, thereby solving the problem that the fundus oculi image analysis model is inaccurate in fundus oculi image analysis due to the insufficient number of sample fundus oculi images.

Figure 4:
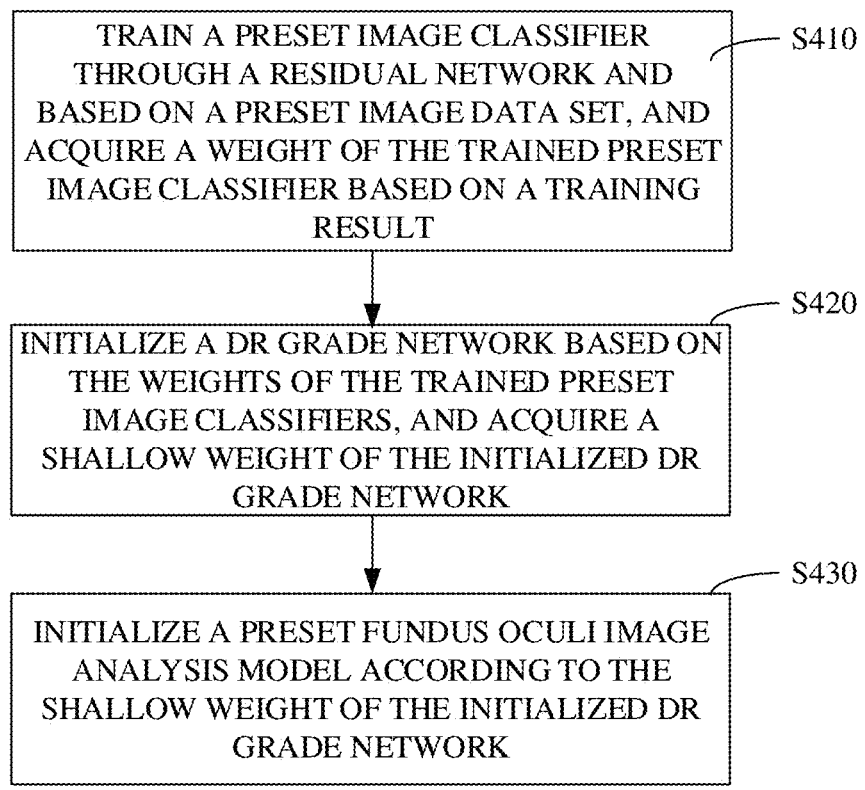
FIG. 4 is a flowchart of initializing a preset fundus oculi image analysis model by migration learning according to an embodiment.

In one embodiment, as shown in FIG. 4, a flow chart of initializing the preset fundus oculi image analysis model by migration learning includes steps S410 to S430.

At step S410, a preset image classifier is trained through a residual network based on a preset image data set, and a weight of the trained preset image classifier is acquired based on a training result.

In an embodiment, the residual network is an 18-layer residual network, the preset image data set is an ImageNet data set, and the weight of the trained preset image classifier acquired from the training result is regarded as the initialization weight of the next network. The preset image classifier network is a network that can be used to identify basic features of an image.

At step S420, a DR grade network is initialized based on the weights of the trained preset image classifiers, and a shallow weight of the initialized DR grade network is acquired.

The DR network is a network determined by training that can be used to identify a partial lesion in a fundus oculi image.

At step S430, a preset fundus oculi image analysis model is initialized according to the shallow weight of the initialized DR grade network.

The shallow weight of the DR grade network after the initialization is used as the initialization weight of the preset fundus oculi image analysis model. In the foregoing method, a two-step migration learning method is adopted to solve the inaccuracy problem of the analysis of the fundus oculi image analysis model due to insufficient number of samples in training.

In one embodiment, the method of the fundus oculi image analysis further includes:

at least one of a macula lutea center initial position image of the target fundus oculi image and an optic disc center initial position image of the target fundus oculi image is predicted and determined by the residual network determined by training.

When the macula lutea center initial position image is predicted, first image features are extracted from the macula lutea center initial position image, and the macula lutea center position of the target fundus oculi image is determined based on the extracted first image features by a first depth convolutional neural network determined by training.

When the optic disc center initial position image is predicted, second image features are extracted from the optic disc center initial position image, and the macula lutea center position of the optic disc fundus oculi image is determined based on the extracted second image features by a second depth convolutional neural network determined by training.

The macula lutea center initial position image is a rough image centered on the macula lutea in the target fundus oculi image, and the optic disc center initial position image is a rough image centered on the optic disc in the target fundus oculi image. The first image features are macula lutea features in the macula lutea center initial position image, and the second image features are optic disc features in the optic disc center initial position image.

In one embodiment, the first depth convolutional neural network and the second depth convolutional neural network may be the same network or different networks. In a specific embodiment, both the first depth convolutional neural network and the second depth convolutional neural network adopt the VGG16 network. In one embodiment, the residual network is a Resnet-50 network.

In one embodiment, the entire fundus oculi image is convolved through the main network of Resnet-50 to regressively predict the centers of the macula lutea and optic disc. Since the input image is compressed into 224*224 which is lossy, regions including the centers of the macula lutea and the optic disc with the sizes of 800*800, 900*900, 1000*1000, 1100*1100 and 1200*1200 are cropped out respectively in training, and are compressed into 224*224 to regressively predict the centers of the macula lutea and the optic disc through the main network of VGG16. In the testing process, the original region of 1000*1000 is cropped out centered on the centers of the macula lutea and the optic disc predicted in the first step, and is regarded as the input of the Visual Geometry Group (VGG) in the second step.

In a specific embodiment, it is necessary to analyze a fundus oculi image by the above method of fundus oculi image analysis. The fundus oculi image analysis model includes: an image overall grade prediction sub-model and an image quality factor sub-model; the image quality factor sub-model including an image artifact analysis sub-model, an image clarity analysis sub-model, and an image position analysis sub-model is taken as an example. The steps are as follows.

Firstly, the fundus oculi image is subjected to preliminary processing to cropped out a fundus oculi image including an effective image region. Since the fundus oculi image is a fundus oculi image in a rectangular coordinate system, the fundus oculi image is converted into a fundus oculi image in a polar coordinate system. Then, the fundus oculi image in the rectangular coordinate system and the fundus oculi image in the polar coordinate system are inputted into a fundus oculi image analysis system, respectively. The fundus oculi image analysis system includes two encoders, i.e., a rectangular coordinate system encoder and a polar coordinate system encoder, respectively. The two target fundus images are inputted into the corresponding encoders for image analysis. The rectangular coordinate encoder extracts rectangular coordinate features of the fundus oculi image, and the polar coordinate encoder extracts polar coordinate features of the fundus oculi image.

After the target fundus oculi image to be analyzed is acquired, the fundus oculi image analysis system performs feature extraction and feature analysis on the target fundus oculi image by the fundus oculi image analysis model determined by training to acquire an image analysis result of the target fundus oculi image. The image analysis result includes a prediction result of whether or not the target fundus oculi image is gradable and an image quality factor analysis result of the target fundus oculi image. The image quality factor analysis result includes an image artifact analysis result, an image clarity analysis result, and an image position analysis result.

The feature extraction for the target fundus oculi image includes: only the image features in the rectangular coordinate system are extracted by the image overall grade prediction sub-model to acquire a result of whether the image is gradable; the image artifact analysis, clarity analysis, and position analysis sub-models extract the image linking features acquired by linking the rectangular coordinate system features and the polar coordinate system features, and the analysis results of the artifact, clarity, and position of the fundus oculi image are respectively acquired.

The result acquired after the image is predicted by the image overall grade prediction sub-model is a numerical value of 0 to 1, which reflects whether the fundus oculi image is gradable or not. Whether the fundus oculi image is gradable refers to whether the fundus oculi image is DR-gradable. Specifically, if the overall grade prediction result is less than 0.5, it is determined that the fundus oculi image is not gradable, and if the overall grade prediction result is greater than or equal to 0.5, it is determined that the fundus oculi image is gradable.

The results acquired after the image is analyzed by the image artifact analysis sub-model include: 1) whether it is greater than 0; 2) whether it is greater than 1; 3) whether it is greater than 4; 4) whether it is greater than 6; and 5) whether it is greater than 8.

The results acquired after the image is analyzed by the image clarity analysis and image position analysis sub-models include: 1) whether it is greater than 1; 2) whether it is greater than 4; 3) whether it is greater than 6; and 4) whether it is greater than 8.

For the results of the image artifact analysis, the scores of the five types on artifact factor of the fundus oculi image are categorized into 6 cases (0 point, 1 point, 4 points, 6 points, 8 points, 10 points). The correspondence relationship between the specific scores and the fundus oculi image information is shown in Table 1.

For the analysis results of image clarity and position, the scores of the four types on clarity factor and position factor of the fundus oculi image are categorized into 5 cases (1 point, 4 points, 6 points, 8 points, 10 points). The correspondence relationship between the specific scores and the fundus oculi image information is shown in Table 1.

In a specific example, for the training of the fundus oculi image analysis model, the steps are as follows: first, all sample fundus oculi images are processed to acquire a fundus oculi image containing only the effective image regions, and a fundus oculi image in polar coordinates is acquired by conversion. Two sample fundus oculi images in the rectangular coordinate system and the polar coordinate system of each sample image are inputted to a preset fundus oculi image analysis model, and the fundus oculi image analysis model is determined by training.

The sample fundus oculi image is a fundus oculi image that is manually analyzed and scored, specifically including analyzing and scoring from three aspects of artifact, clarity, and consideration position (the scoring criteria are shown in Table 1). And then according to the relationship: quality score=clarity score+position score−artifact score to determine a quality score of the fundus oculi image, and the quality score is for indicating whether or not the fundus oculi image is gradable. In the illustrated embodiment, the fundus oculi image having a quality score greater than 10 are identified as gradable, and the fundus oculi image having a quality score of 10 or less is identified as ungradable.

The overall grade prediction sub-model in the preset fundus oculi image analysis model extracts the rectangular coordinate system features of the sample fundus oculi image, the artifact analysis, the clarity analysis, and the position analysis sub-models extract the rectangular coordinate system features, the polar coordinate system features, and the image linking features acquired by linking the rectangular coordinate system features and the polar coordinate system features of the sample fundus oculi image. The foregoing features are used to optimize the overall loss function of the fundus oculi image analysis model. The overall loss function is determined as follows:

$$L = \alpha \sum_{t=a,c,f} L_{tp} + \beta \sum_{t=a,c,f} L_{tr} + \gamma \sum_{t=a,c,f} L_t + \delta L_q$$

$\alpha$, $\beta$, $\gamma$, and $\delta$ are weights of the loss function determined by the branches of different features extracted by the sub-models, subscripts r, p are the rectangular coordinate system and the polar coordinate system, respectively, and a, c, f, and q are the artifact, clarity, position, and overall grade prediction sub-models, respectively.

The loss function determined by the branches of each sub-model extracting different features uses a Sigmoid cross entropy loss function. For example, the loss function of the overall grade prediction sub-model is as follows:

$$L_q = -\sum_{i=0}^{N} (y_i^q \cdot \log \hat{y}_i^q + (1 - y_i^q) \cdot \log(1 - \hat{y}_i^q))$$

$y_i^q \in \{0,1\}$ is the actual score label, $$\hat{y}_t^q = \frac{1}{1 + e^{h_i}}$$

is the predicted value.

In one embodiment, prior to training the preset fundus oculi image analysis model, a two-step migration learning of the weights for initialization of the preset fundus oculi image analysis model is further included.

In an embodiment, the migration learning includes steps of:

training an image classifier through a shallow residual network based on an ImageNet database to determine a first shallow weight;

using the first shallow weight in initialization of a DR grade network to determine a second shallow weight; and using the second shallow weight in initialization of the fundus oculi image analysis model.

In an embodiment, the shallow residual network is an 18-layer residual network. In the illustrated embodiment, an image classifier is trained through an 18-layer residual network based on the ImageNet database to acquire a shallow weight, then the shallow weight is used to initialize the DR grade network, and finally the shallow weight of the DR grade network is used to initialize the fundus oculi image analysis model.

In one embodiment, the method of fundus oculi image analysis further includes the steps of analyzing the fundus oculi image for positions of the macula lutea and optic disc. The target fundus oculi image is inputted into the Resnet-50 network, the features of the whole image are extracted, the positions of the macula lutea and optic disc are roughly predicted respectively, then the rough positions of the macula lutea and the optic disc are inputted into the VGG16 network; the features of the macula lutea region and the optic disc region are extracted, and the positions of the centers of the macula lutea region and the optic disc region are accurately predicted. This facilitates the diagnosis of glaucoma and grading of diabetic macula lutea degeneration.

Figure 5:
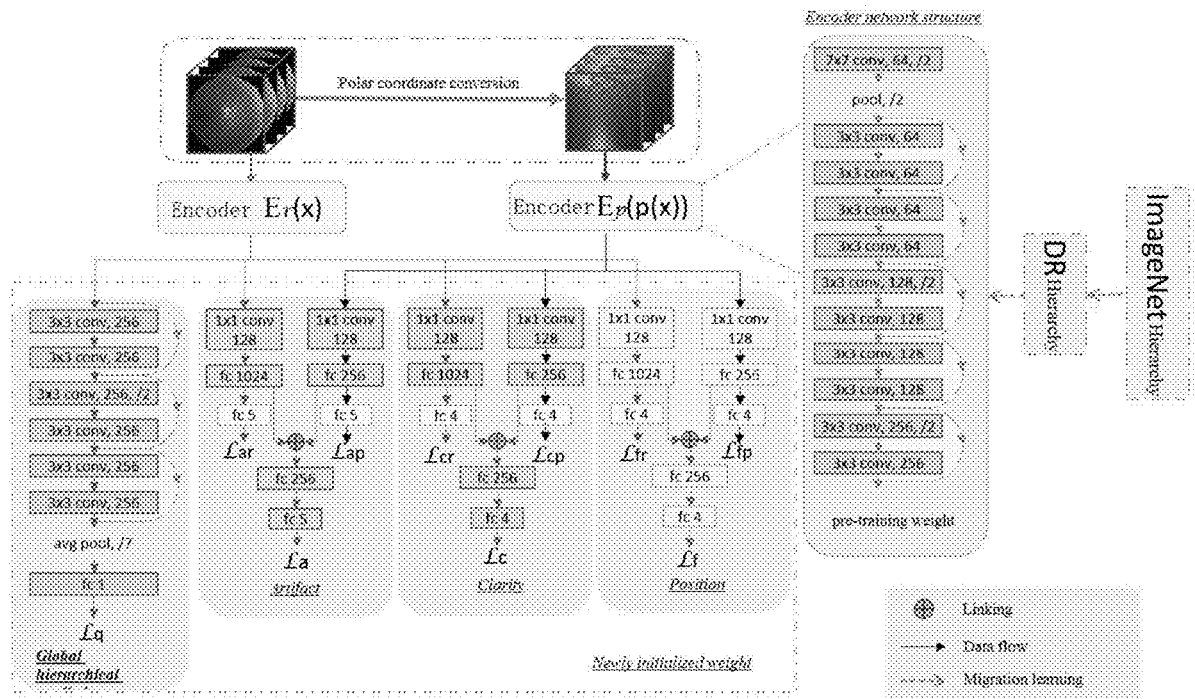
FIG. 5 is a schematic diagram of fundus oculi image analysis model according to an embodiment.

In one embodiment, as shown in FIG. 5, it is a frame schematic diagram of the fundus oculi image analysis model in the illustrated embodiment. The cony (convolutional layer) is the convolution layer, and the fc (fully connected layer) is the fully connected layer.

Figure 6:
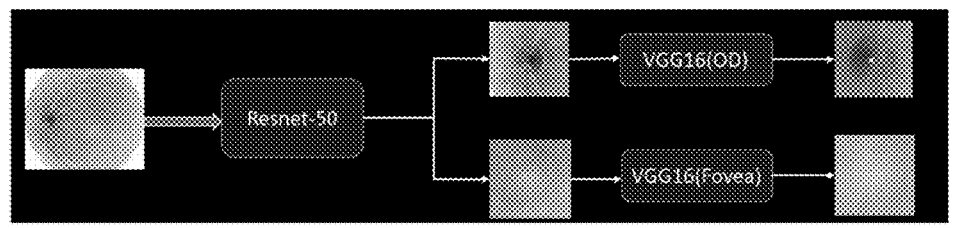
FIG. 6 is a schematic diagram of a macula lutea and optic disc center prediction model according to an embodiment.

In one embodiment, as shown in FIG. 6, it is a schematic view of the framework of the macula lutea and optic disc center prediction model in the illustrated embodiment.

In the illustrated embodiment, since image information can be lost if the inputted image is compressed into 224*224, in the process of training the macula lutea and optic disc center prediction models, regions including the centers of the macula lutea and optic disc and having sizes of 800*800, 900*900, 1000*1000, 1100*1100, and 1200*1200 are respectively cropped out and compressed to a size of 224*224, and then the centers of the macula lutea and the optic disc are regressed through the main network of VGG16. In the process of predicting the centers of the macula lutea and the optic disc through the above model, an original region of 1000*1000 centered on the center of the macula lutea optic disc acquired through the first step prediction is cropped out as the input of the VGG network.

Through the above method of fundus oculi image analysis, an image that cannot be graded due to poor quality can be filtered out, and the result of whether the image can be graded is determined by the combination of the three factors of artifact, the clarity, and the position that affect the quality, and the reliability of the determined result is high. In addition, that migration learning method is adopted to implicitly increase the data volume, and the multi-task learning method is used to avoid the network training from over-fitting on a single task. Furthermore, the positioning of the centers of the optic disc and the macula lutea can also be determined, which facilitates the diagnosis of glaucoma and the grading of diabetic macula lutea degeneration, etc.

It should be understood that although the various steps in the flowcharts of FIGS. 1 to 4 are shown sequentially as indicated by the arrows, these steps are not necessarily performed sequentially in the order indicated by the arrows. Except as explicitly stated herein, the execution of these steps is not strictly limited, and the steps may be performed in other orders. Moreover, at least a part of the steps in FIGS. 1 to 4 may include a plurality of sub-steps or stages, which are not necessarily performed at the same time, but may be performed at different times, and the order in which the sub-steps or stages are performed is not necessarily performed sequentially, but may be performed in turn or alternatively with other steps or at least a part of sub-steps or stages of other steps.

Figure 7:
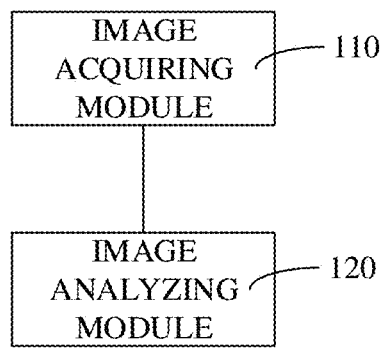
FIG. 7 is a block diagram of an apparatus of fundus oculi image analysis according to an embodiment.

In an embodiment, the present disclosure further provides an apparatus of fundus oculi image analysis, as shown in FIG. 7, which includes:

an image acquiring module configured to acquire a target fundus oculi image; and an image analysis module configured to analyze the target fundus oculi image by the fundus oculi image analysis model determined by training to acquire an image analysis result of the target fundus oculi image.

The fundus oculi image analysis model includes at least one of an image overall grade prediction sub-model and an image quality factor sub-model. When the fundus oculi image analysis model includes the image overall grade prediction sub-model, the image analysis result includes a prediction result of whether or not the target fundus oculi image is gradable. When the fundus oculi image analysis model includes an image quality factor sub-model, the image analysis result includes an image quality factor analysis result of the target fundus oculi image.

In an embodiment, the image analysis module includes an image feature extraction module and an image feature analysis module.

The image feature extraction module is configured to extract image features of the target fundus oculi image.

The image feature analysis module is configured to analyze image features of the target fundus oculi image to acquire an image analysis result of the target fundus oculi image.

In one embodiment, the apparatus further includes an image analysis model determining module, the image analysis model determining module including a sample image acquiring module and a model training module.

The sample image acquiring module is configured to acquire sample fundus oculi images and respectively extracting image features of the sample fundus oculi images.

The model training module is configured to perform model training on a preset fundus oculi image analysis model based on the extracted image features of each of the sample fundus oculi images to acquire the fundus oculi image analysis model.

For specific limitations of the apparatus of fundus oculi image analysis, reference may be made to the limitations of the method of fundus oculi image analysis, and details are omitted for brevity. All or part of the modules in the apparatus of fundus oculi image analysis may be implemented by software, hardware, or a combination thereof. Each of the above modules may be embedded in or independent from the processor in the computer device in the form of hardware, or may be stored in the memory in the computer device in the form of software, so that the processor calls and executes the operations corresponding to each of the above modules.

Figure 8:
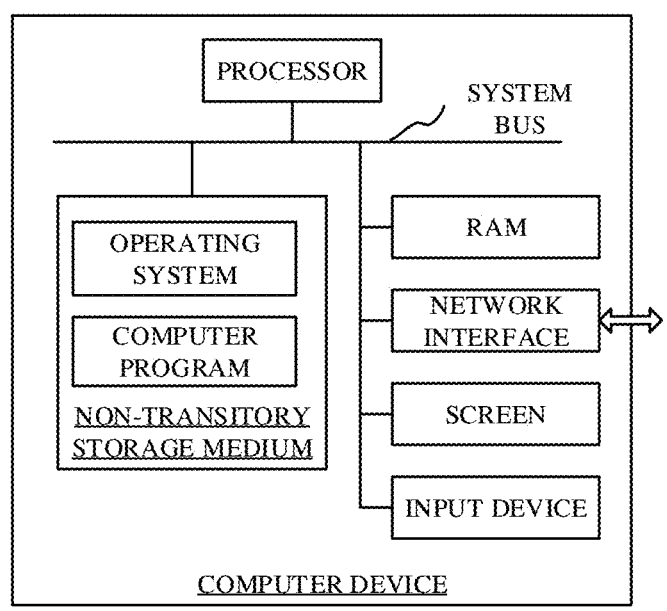
FIG. 8 is a schematic diagram of an internal structure of a computer device according to an embodiment.

In an embodiment, a computer device is provided, the computer device may be a terminal, and a schematic diagram of the internal structural thereof may be as shown in FIG. 8. The computer device includes a processor, a memory, a network interface, a display screen, and an input device connected through a system bus. The processor of the computer device is configured to provide calculation and control capabilities. The memory of the computer device includes a non-transitory storage medium and a random access memory (RAM). The non-transitory storage medium has an operating system and a computer program stored therein. The RAM provides an environment for the operation of the operating system and the computer program in the non-transitory storage medium. The network interface of the computer device is configured to communicate with an external terminal through a network connection. The computer program is executed by the processor to implement a method of fundus oculi image analysis. The display screen of the computer device may be a liquid crystal display screen or an electronic ink display screen. The input device of the computer device may be a touch layer covered on the display screen, a key, a trackball or a touch pad provided on the casing of the computer device, or an external keyboard, a touch pad or a mouse etc.

It can be understood by those skilled in the art that, the structure shown in FIG. 8 is only a block diagram of a partial structure related to the solution of the present disclosure, and does not constitute a limitation on the computer device to which the solution of the illustrated application is applied.

The particular computer device may include more or less components than those shown in the figure, combine other components, or have a different arrangement of components.

In one embodiment, a computer device is provided, including a processor and a memory having a computer program stored therein which, when executed by the processor, causes the processor to implement the method of fundus oculi image analysis according to any of the foregoing embodiments.

In one embodiment, a computer-readable storage medium is provided, having a computer program stored thereon which, when executed by a processor, causes the processor to implement the method of fundus oculi image analysis according to any of the foregoing embodiments.

Persons of ordinary skill in the art understand that all or part of the processes in the methods of the foregoing embodiments may be implemented by a computer program instructing relevant hardware. The computer program may be stored in a non-transitory computer-readable storage medium. When the computer program is executed, flows of embodiments of the methods as described above may be included. Any references to memory, storage, databases, or other media used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), Synchronous Link DRAM (SLDRAM), Memory Bus (Rambus) Direct RAM (RDRAM), Direct Memory Bus Dynamic RAM (DRDRAM), Memory Bus Dynamic RAM (RDRAM) etc.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be object to the protection scope of the claims.

What is claimed is:

1. A method of fundus oculi image analysis, comprising:
   acquiring a target fundus oculi image; and
   analyzing the target fundus oculi image by a fundus oculi image analysis model determined by training to acquire an image analysis result of the target fundus oculi image;
   wherein the fundus oculi image analysis model comprises at least one of an image overall grade prediction sub-model or an image quality factor sub-model;
   wherein when the fundus oculi image analysis model comprises the image overall grade prediction sub-model, the image analysis result comprises a prediction result of whether or not the target fundus oculi image is gradable; and
   wherein when the fundus oculi image analysis model comprises the image quality factor sub-model, the image analysis result comprises an image quality factor analysis result of the target fundus oculi image;
   wherein the analyzing the target fundus oculi image by the fundus oculi image analysis model determined by training to acquire the image analysis result of the target fundus oculi image comprises:
   extracting image features of the target fundus oculi image; and
   analyzing the image features of the target fundus oculi image to acquire the image analysis result of the target fundus oculi image;
   wherein when the fundus oculi image analysis model comprises the image overall grade prediction sub-model, the image features comprise first rectangular coordinate system image features; and
   when the fundus oculi image analysis model comprises the image quality factor sub-model, the image features comprise: first image linking features acquired by linking second rectangular coordinate system image features with first polar coordinate system image features.

2. The method according to claim 1, wherein:
   the image quality factor sub-model comprises at least one of an image artifact analysis sub-model, an image clarity analysis sub-model, and an image position analysis sub-model;
   when the image quality factor sub-model comprises the image artifact analysis sub-model, the image quality factor analysis result comprises image artifact information;
   when the image quality factor sub-model comprises the image clarity analysis sub-model, the image quality factor analysis result comprises image clarity information; and
   when the image quality factor sub-model comprises the image position analysis sub-model, the image quality factor analysis result comprises image position information.

3. The method according to claim 1, wherein prior to extracting the image features of the target fundus oculi image, the method further comprises cropping out an effective image region of the target fundus oculi image.

4. The method according to claim 1, wherein:
   the image quality factor sub-model comprises: at least one of an image artifact analysis sub-model, an image clarity analysis sub-model, and an image position analysis sub-model;
   when the image quality factor sub-model comprises the image artifact analysis sub-model, the second rectangular coordinate system image features comprise rectangular coordinate system artifact factor features, the first polar coordinate system features comprise polar coordinate system artifact factor features, and the first image linking features comprise: artifact factor linking features acquired by linking the rectangular coordinate system artifact factor features with the polar coordinate system artifact factor features;
   when the image quality factor sub-model comprises the image clarity analysis sub-model, the second rectangular coordinate system image features comprise rectangular coordinate system clarity factor features, the first polar coordinate system features comprise polar coordinate system clarity factor features, and the first image linking features comprise clarity factor linking features acquired by linking rectangular coordinate system clarity factor linking features with the polar coordinate system clarity factor features; and when the image quality factor sub-model comprises the image position analysis sub-model, the second rectangular coordinate system image features comprise rectangular coordinate system position factor features, the first polar coordinate system features comprise polar coordinate system position factor features, and the first image linking features comprise position factor linking features acquired by linking rectangular coordinate system position factor linking features with the polar coordinate system position factor features.

5. The method according to claim 1, wherein analyzing the target fundus oculi image by the fundus oculi image analysis model determined by training to acquire the image analysis result of the target fundus oculi image comprises:

acquiring sample fundus oculi images and extracting image features of each of the sample fundus oculi images, respectively; and performing model training on a preset fundus oculi image analysis model based on the extracted image features of each of the sample fundus oculi images to acquire the fundus oculi image analysis model.

6. The method according to claim 5, wherein prior to extracting the image features of each of the sample fundus oculi images, the method further comprises cropping out an effective image region of each of the sample fundus oculi images.

7. The method according to claim 5, wherein:

extracting the image features of each of the sample fundus oculi images comprises:

when the fundus oculi image analysis model comprises the image overall grade prediction sub-model, the image features comprise third rectangular coordinate system image features; and when the fundus oculi image analysis model comprises the image quality factor sub-model, the image features comprise: fourth rectangular coordinate system image features, second polar coordinate system image features, and second image linking features acquired by linking fourth rectangular coordinate system image features and the second polar coordinate system image features.

8. The method according to claim 5, wherein prior to the model training the preset fundus oculi image analysis model, the method further comprises initializing the preset fundus oculi image analysis model by migration learning.

9. The method according to claim 8, wherein the migration learning comprises:

training an image classifier through a shallow residual network based on an ImageNet database to determine a first shallow weight;

using the first shallow weight to initialize a Diabetic Retinopathy (DR) grade network to determine a second shallow weight; and using the second shallow weight to initialize the fundus oculi image analysis model.

10. The method according to claim 1, further comprising:

predicting and determining at least one of a macula lutea center initial position image of the target fundus oculi image or an optic disc center initial position image of the target fundus oculi image by the residual network determined by training;

extracting first image features from the macula lutea center initial position image, and determining, based on the extracted first image features, a macula lutea center position of the target fundus oculi image by a first depth convolutional neural network determined by training; and extracting second image features from the optic disc center initial position image, and determining, based on the extracted second image features, the macula lutea center position of an optic disc fundus oculi image by a second depth convolutional neural network determined by training.

11. The method according to claim 10, wherein the residual network is a Resnet-50 network.

12. The method according to claim 10, wherein the first depth convolutional neural network is a Visual Geometry Group (VGG) 16 network.

13. The method according to claim 10, wherein the second depth convolutional neural network is a Visual Geometry Group (VGG) 16 network.

14. A computer device comprising a memory and one or more processors, wherein the memory having computer-readable instructions stored therein which, when executed by the one or more processors, causing the one or more processors to perform a method comprising:

acquiring a target fundus oculi image; and analyzing the target fundus oculi image by a fundus oculi image analysis model determined by training to acquire an image analysis result of the target fundus oculi image;

wherein the fundus oculi image analysis model comprises at least one of an image overall grade prediction sub-model and an image quality factor sub-model;

wherein when the fundus oculi image analysis model comprises the image overall grade prediction sub-model, the image analysis result comprises a prediction result of whether or not the target fundus oculi image is gradable; and wherein when the fundus oculi image analysis model comprises an image quality factor sub-model, the image analysis result comprises an image quality factor analysis result of the target fundus oculi image;

wherein the analyzing the target fundus oculi image by the fundus oculi image analysis model determined by training to acquire the image analysis result of the target fundus oculi image comprises:

extracting image features of the target fundus oculi image; and analyzing the image features of the target fundus oculi image to acquire the image analysis result of the target fundus oculi image;

wherein when the fundus oculi image analysis model comprises the image overall grade prediction sub-model, the image features comprise first rectangular coordinate system image features; and when the fundus oculi image analysis model comprises the image quality factor sub-model, the image features comprise: first image linking features acquired by linking second rectangular coordinate system image features with first polar coordinate system image features.

15. One or more non-transitory computer-readable storage medium having storing computer-readable instructions stored therein which, when executed by one or more processors, causing the one or more processors to perform a method comprising:

acquiring a target fundus oculi image; and analyzing the target fundus oculi image by a fundus oculi image analysis model determined by training to acquire an image analysis result of the target fundus oculi image;

wherein the fundus oculi image analysis model comprises at least one of an image overall grade prediction sub-model and an image quality factor sub-model;

wherein when the fundus oculi image analysis model comprises the image overall grade prediction sub-model, the image analysis result comprises a prediction result of whether or not the target fundus oculi image is gradable; and wherein when the fundus oculi image analysis model comprises an image quality factor sub-model, the image analysis result comprises an image quality factor analysis result of the target fundus oculi image;

wherein the analyzing the target fundus oculi image by the fundus oculi image analysis model determined by training to acquire the image analysis result of the target fundus oculi image comprises:

extracting image features of the target fundus oculi image; and analyzing the image features of the target fundus oculi image to acquire the image analysis result of the target fundus oculi image;

wherein when the fundus oculi image analysis model comprises the image overall grade prediction sub-model, the image features comprise first rectangular coordinate system image features; and when the fundus oculi image analysis model comprises the image quality factor sub-model, the image features comprise: first image linking features acquired by linking second rectangular coordinate system image features with first polar coordinate system image features.

* * * * *